(12) United States Patent
Davis et al.

(10) Patent No.: US 10,041,366 B2
(45) Date of Patent: Aug. 7, 2018

(54) SEAL

(71) Applicant: UNITED TECHNOLOGIES CORPORATION, Farmington, CT (US)

(72) Inventors: Timothy M. Davis, Kennebunk, ME (US); Paul M. Lutjen, Kennebunkport, ME (US); Jeremy Drake, South Berkwick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/693,473

(22) Filed: Apr. 22, 2015

(65) Prior Publication Data

US 2016/0312634 A1     Oct. 27, 2016

(51) Int. Cl.
| | | |
|---|---|---|
| *F02F 11/00* | (2006.01) | |
| *F01D 11/00* | (2006.01) | |
| *F16J 15/08* | (2006.01) | |
| *F16J 15/00* | (2006.01) | |
| *F16J 15/06* | (2006.01) | |

(52) U.S. Cl.
CPC .......... *F01D 11/005* (2013.01); *F01D 11/003* (2013.01); *F16J 15/002* (2013.01); *F16J 15/062* (2013.01); *F16J 15/064* (2013.01); *F16J 15/08* (2013.01); *F16J 15/0887* (2013.01); *F05D 2220/32* (2013.01); *F05D 2240/11* (2013.01); *F05D 2240/55* (2013.01); *F05D 2250/75* (2013.01); *Y02T 50/672* (2013.01)

(58) Field of Classification Search
CPC .. F01D 11/005; F01D 11/003; F05D 2220/32; F05D 2220/55; F05D 2240/11; F05D 2240/55; F05D 2250/75; F16J 15/002; F16J 15/062; F16J 15/064; F16J 15/08; F16J 15/0887; Y02T 50/672
USPC ...................... 277/590, 594, 595, 345, 346
See application file for complete search history.

(56) References Cited

U.S. PATENT DOCUMENTS

| | | | | |
|---|---|---|---|---|
| 4,125,929 | A | * | 11/1978 | Rode ........................ B23P 15/00 29/446 |
| 4,783,085 | A | | 11/1988 | Wicks et al. |
| 5,014,917 | A | | 5/1991 | Sirocky et al. |
| 7,347,425 | B2 | | 3/2008 | James |
| 7,347,662 | B2 | * | 3/2008 | Balsdon ................ F01D 11/005 415/174.2 |
| 8,651,497 | B2 | | 2/2014 | Tholen et al. |
| 2006/0078421 | A1 | * | 4/2006 | Balsdon ................ F01D 11/005 415/170.1 |

(Continued)

FOREIGN PATENT DOCUMENTS

| | | |
|---|---|---|
| EP | 1316677 A1 | 6/2003 |
| EP | 1645726 A1 | 4/2006 |

(Continued)

OTHER PUBLICATIONS

EP SR, dated Aug. 23, 2016.

*Primary Examiner* — Nathan Cumar
(74) *Attorney, Agent, or Firm* — Cantor Colburn LLP

(57) ABSTRACT

The present disclosure relates generally to a sliding seal between two components. The sliding seal includes a substantially radially extending rail and a substantially axially extending leg, such that the seal has a substantially J-shaped cross-section.

17 Claims, 13 Drawing Sheets

(56) References Cited

U.S. PATENT DOCUMENTS

| | | | |
|---|---|---|---|
| 2007/0149031 A1* | 6/2007 | Martin | F01D 11/005 |
| | | | 439/395 |
| 2009/0243228 A1 | 10/2009 | Heinemann et al. | |
| 2011/0150635 A1 | 6/2011 | Motzkus et al. | |
| 2011/0179798 A1* | 7/2011 | Pieussergues | F01D 9/023 |
| | | | 60/752 |
| 2013/0113168 A1 | 5/2013 | Lutjen et al. | |
| 2014/0183825 A1* | 7/2014 | Chuong | F16J 15/0887 |
| | | | 277/411 |

FOREIGN PATENT DOCUMENTS

| | | |
|---|---|---|
| EP | 3012493 A1 | 4/2016 |
| WO | 2015002673 A2 | 1/2015 |
| WO | 2015031384 A1 | 3/2015 |

* cited by examiner

SEAL

TECHNICAL FIELD OF THE DISCLOSURE

The present disclosure is generally related to seals and, more specifically, to a seal for a circumferential cavity.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. Additionally, some small and controlled level of cooling and/or purge flow is often desired at gas-path seal cavities to prevent exceeding a desired operating temperature of the forward and/or aft end-walls of turbine components (e.g. blade outer air seal (BOAS) or vanes) and/or ingestion of hot gas-path air into secondary flow passages.

Improvements in seal design are therefore needed in the art.

SUMMARY OF THE DISCLOSURE

In one embodiment, a seal for sealing a seal cavity defined by first and second adjacent components disposed about an axial centerline is disclosed, the seal comprising: a first seal comprising a split hoop including a substantially radially-extending rail and a substantially axially-extending leg; and a plurality of slots formed into at least one of the rail and the leg; wherein the plurality of slots allows a flow of gas from a first side of the seal to a second side of the seal.

In a further embodiment of the above, the first seal comprises a first seal free-state inner diameter that is smaller than a seal cavity inner diameter, such that a radial preload is achieved between the first seal and at least one of the first and second components In a further embodiment of any of the above, at least one of the plurality of slots comprises an orientation selected from the group consisting of: axial, at an angle to the axial direction, radial and at an angle to the radial direction.

In a further embodiment of any of the above, at least one of the plurality of slots comprises a configuration selected from the group consisting of: constant width, converging and diverging.

In a further embodiment of any of the above, a second seal is disposed within the seal cavity between the first seal and one of the first and second components.

In a further embodiment of any of the above, the second seal comprises one of: a W-seal; and a wave spring and a flat ring.

In a further embodiment of any of the above, the seal is formed from one of a high-temperature metal alloy, a high-temperature ceramic material, and a high-temperature ceramic composite, or a combination of two or more of a high-temperature metal alloy, a high-temperature ceramic material, and a high-temperature ceramic composite.

In a further embodiment of any of the above, at least one of the plurality of slots is formed completely through a thickness of the first seal.

In a further embodiment of any of the above, at least one of the plurality of slots has a slot thickness that is less than a thickness of the first seal.

In a further embodiment of any of the above, at least one of a circumferential axial protrusion is disposed at a radially outer end of the rail and a circumferential radial protrusion disposed at an axially outer end of the leg.

In a further embodiment of any of the above, at least one of the plurality of slots is formed though at least one of the circumferential axial protrusion and the circumferential radial protrusion.

In a further embodiment of any of the above, the at least one of the plurality of slots comprises a shape selected from the group consisting of: linear and keyhole-shaped.

In a further embodiment of any of the above, at least one hole is formed through at least one of the rail, the leg, and a junction between the rail and the leg.

In another embodiment, a seal for sealing a seal cavity defined by first and second adjacent components disposed about an axial centerline is disclosed, the seal comprising: a first seal comprising a split hoop including a substantially radially-extending rail and a substantially axially-extending leg; and a plurality of holes formed into at least one of the rail and the leg; wherein the plurality of holes allows a flow of gas from a first side of the seal to a second side of the seal.

In a further embodiment of any of the above, at least one of a circumferential axial protrusion is disposed at a radially outer end of the rail and a circumferential radial protrusion disposed at an axially outer end of the leg.

In a further embodiment of any of the above, a plurality of slots are formed through at least one of the rail and the leg.

In a further embodiment of any of the above, at least one of the plurality of slots comprises an orientation selected from the group consisting of: axial, at an angle to the axial direction, radial and at an angle to the radial direction.

In a further embodiment of any of the above, at least one of the plurality of slots comprises a configuration selected from the group consisting of: constant width, converging and diverging.

In a further embodiment of any of the above, at least one of the plurality of slots is formed completely through a thickness of the first seal.

In a further embodiment of any of the above, at least one of the plurality of slots has a slot thickness that is less than a thickness of the first seal.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
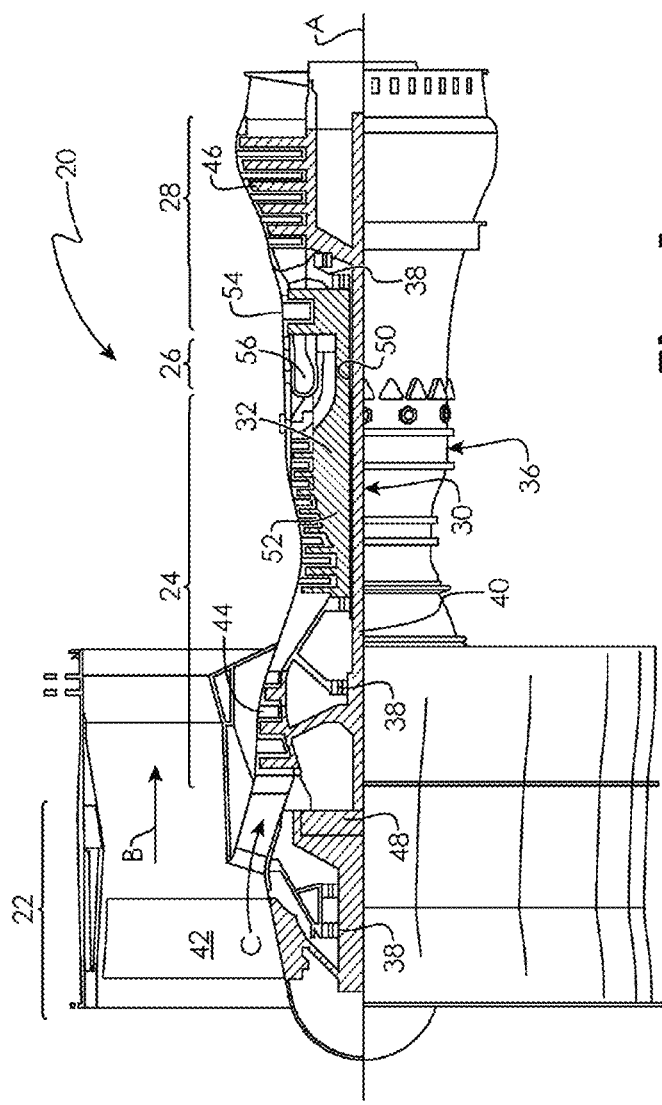
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7 \ °R)]^{0.5}$. The "Low corrected fan tip speed" as disclosed herein according to one non-limiting embodiment is less than about 1150 ft/second (350.5 m/sec).

Figure 2:
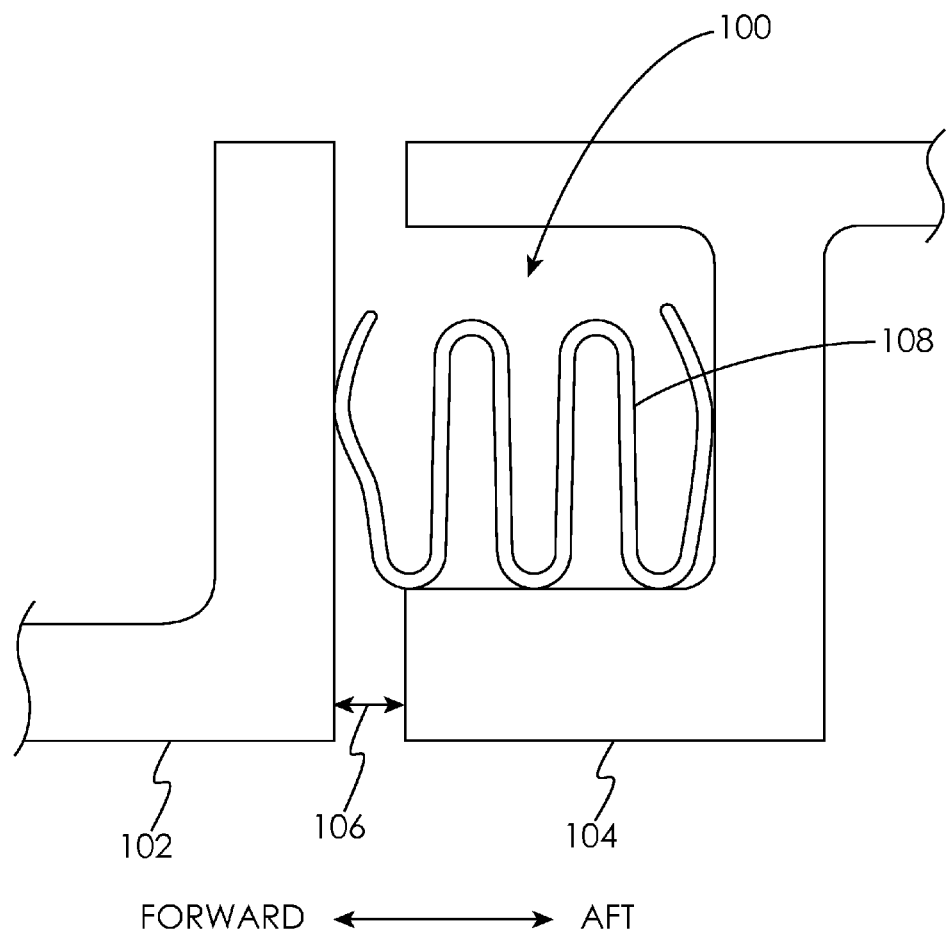
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
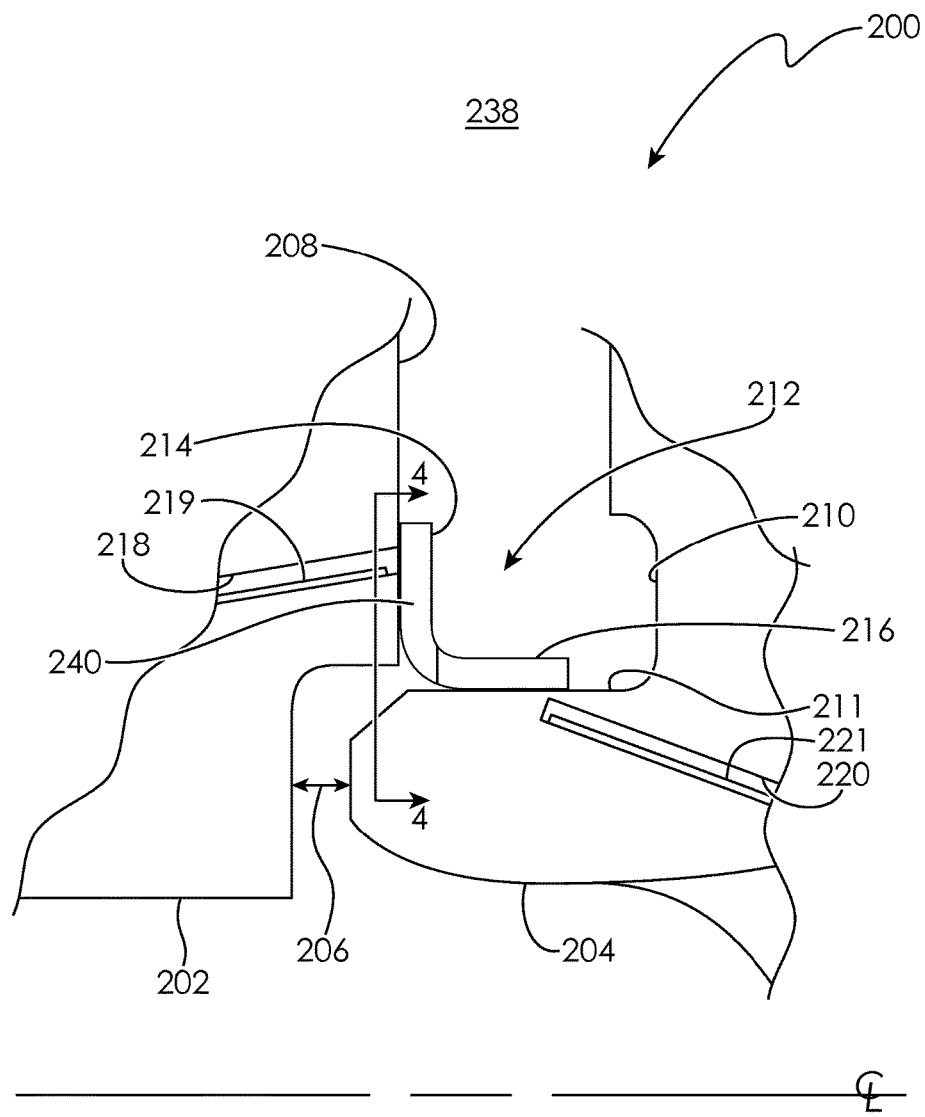
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a generally radially-extending surface 208 facing the seal cavity 200. The component 204 includes a generally radially-extending surface 210 and a generally axially-extending surface 211 facing the seal cavity 200. Within the seal cavity 200 lies a seal 212 formed from a material appropriate to the anticipated operating conditions of the seal 212, such as a high-temperature metal alloy, a low temperature metal alloy, a high temperature ceramic material, a high temperature ceramic composite, or a combination of two or more of these, to name just a few non-limiting examples. In some, but not all, embodiments, a slot 218 is formed through component 202 and contains a feather seal 219, and a slot 220 is formed through component 204 and contains a feather seal 221. The embodiments disclosed herein comprise seals that provide a controlled/metered level of gas flow past the seal. The seal guides this flow in specific directions and along specific surfaces to maximize cooling effectiveness (for the sake of the interfacing hardware and/or the seal), while also providing a level of purge flow to prevent ingestion of hot gas-path air into a secondary flow passage 238.

The seal 212 is formed from a substantially radially-extending rail 214 and a substantially axially-extending leg 216 to form a seal 212 having a substantially J-shaped cross-section. The seal 212 is a split-hoop seal that is in sliding and metering/sealing contact with the radial surface 208 of component 202 and the axial surface 211 of the component 204. The seal 212 may load radially inward against the surface 211 of component 204 via a preload that is achieved by an inner diameter of the seal 212 in the free-state that is smaller than the inner diameter of the seal cavity 200 at the surface 211. A pressure differential across the seal 212 provides additional axial loading against the surface 208 of the component 202 and radial loading against the surface 211 of the component 204.

Figure 4A:
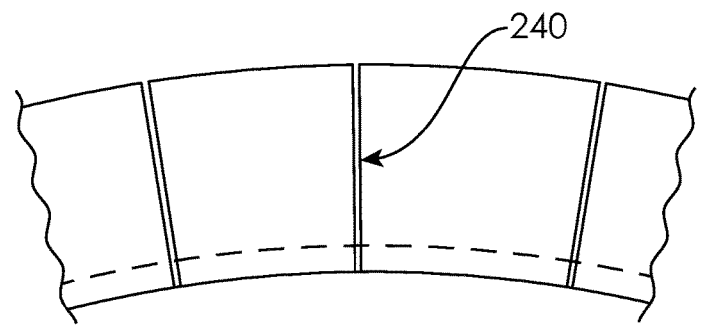
FIG. 4A is a schematic elevational view of a section of the seal of FIG. 3 in an embodiment.
Figure 4B:
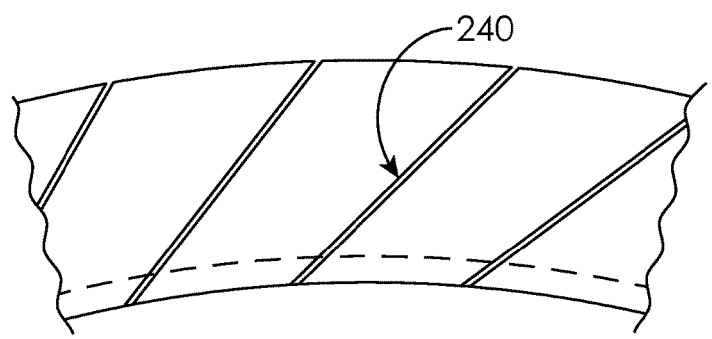
FIG. 4B is a schematic elevational view of a section of the seal of FIG. 3 in an embodiment.
Figure 4C:
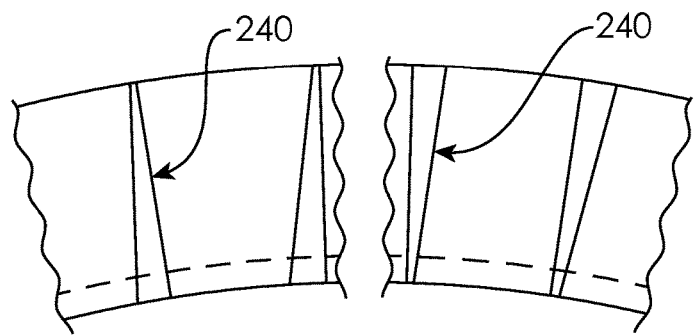
FIG. 4C is a schematic elevational view of a section of the seal of FIG. 3 in an embodiment.

In the embodiment of FIG. 3, the rail 214 includes a plurality of slots 240 formed through its thickness at several circumferential locations. The slots 240 may be formed to any desired width, and may be kept relatively narrow to keep gas flow levels past the seal 212 very low if desired. For example, the slots 240 may be manufactured as thin as 0.002 inch (0.0508 mm) wide in some embodiments using a wire electrical discharge machining (EDM) process, to name just one non-limiting example. The slots 240 may be oriented radially (as shown in FIG. 4A) or at an angle to the radial direction (as shown in FIG. 4B). Radial slots 240, if aligned with intersegment gaps of the component 202, would enable the seal 212 to at least partially conform to reduce leakage associated with stair-stepped component 202 segments. Angling the slots 240 increases the flow coverage (e.g. on the aft face of the component 202) for a given flow rate, and may also reduce the flow trip if angled in the direction of rotation of blades (not shown) rotating past component 202 (i.e., angled away from the approaching blade). In the embodiment of FIG. 4C, convergent and divergent slots 240 may be formed in the seal 240. Such slots create varying flow rates along the length of each slot 240.

Figure 5:
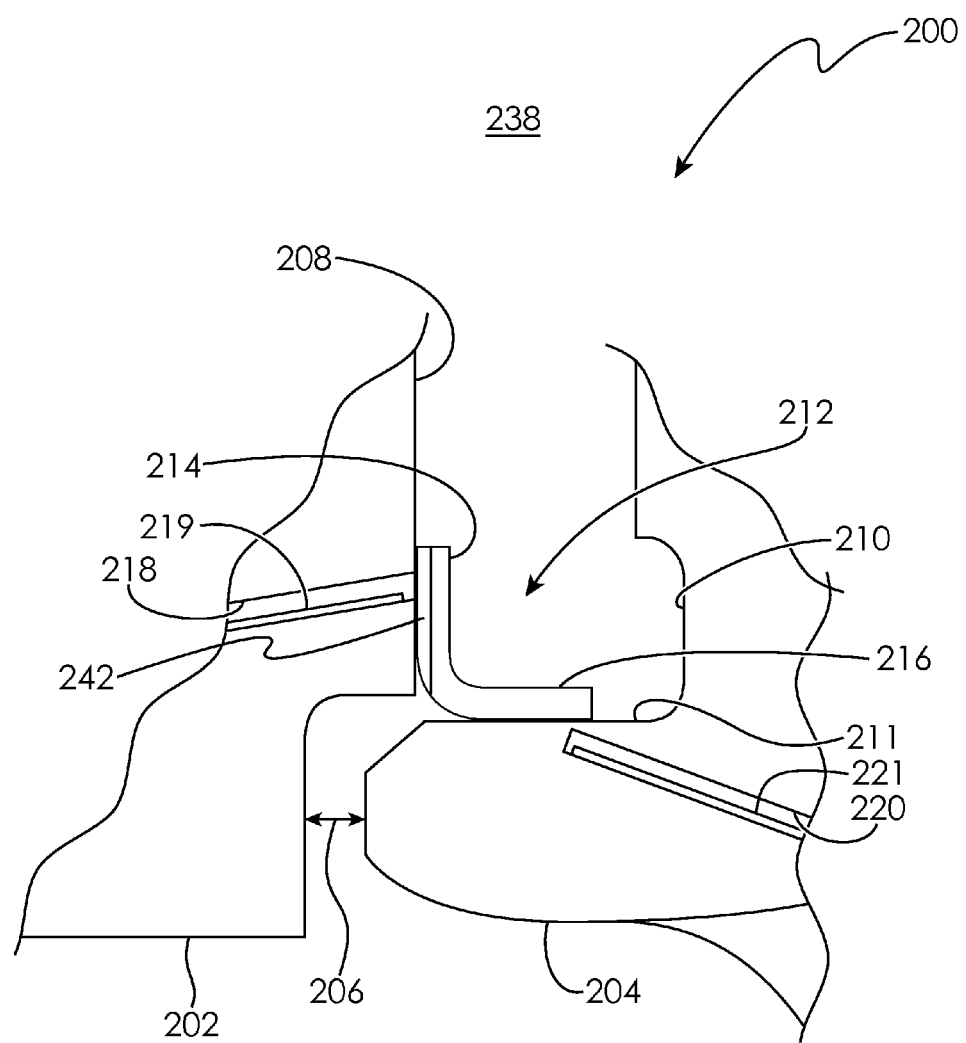
FIG. 5 is a schematic cross-sectional view of a seal and seal cavity in an embodiment.
Figure 6:
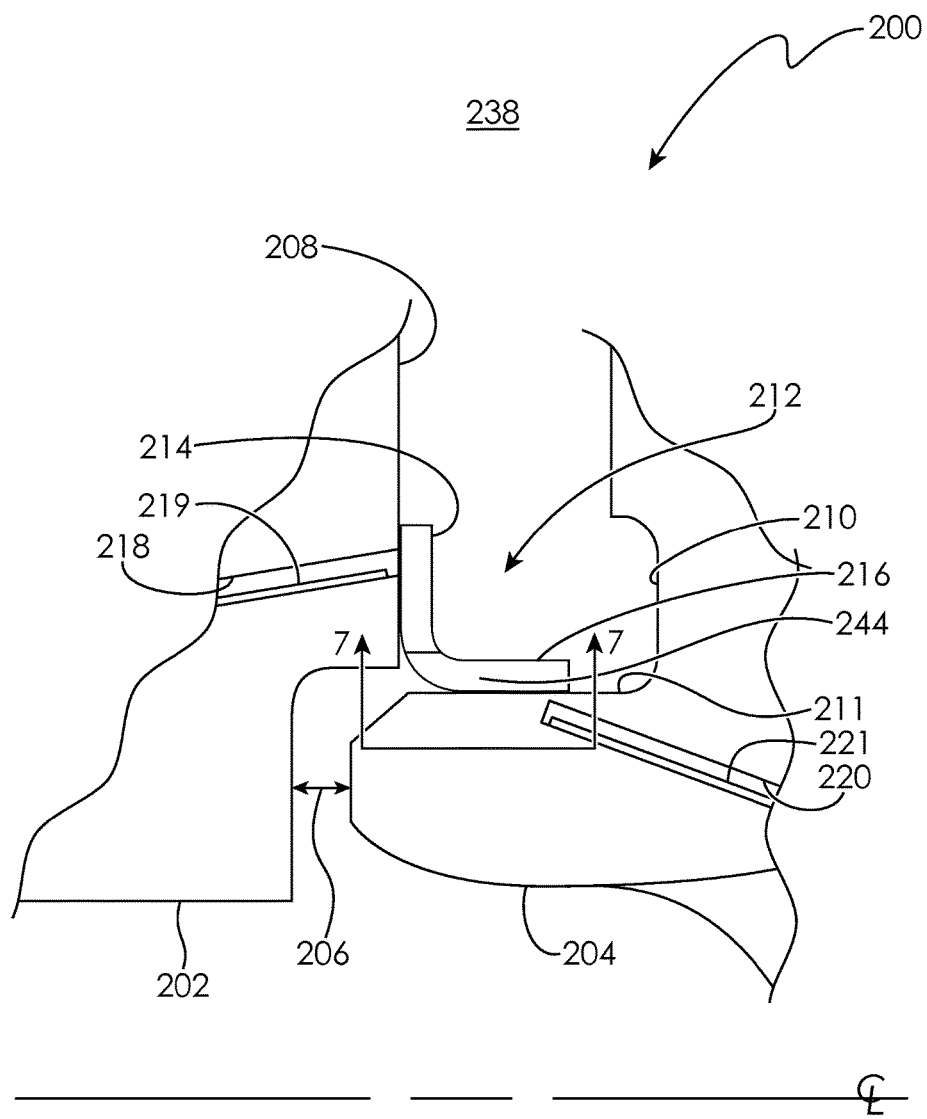
FIG. 6 is a schematic cross-sectional view of a seal and seal cavity in an embodiment.
Figure 7C:
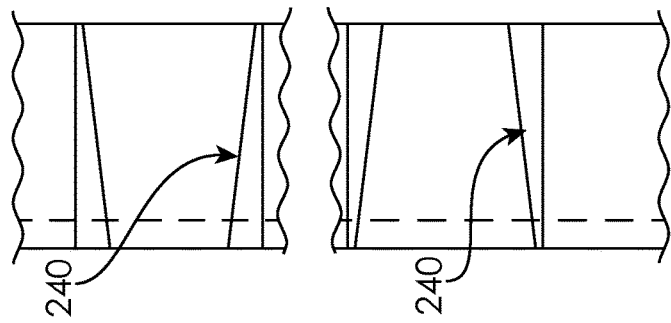
FIG. 7C is a schematic elevational view of a section of the seal of FIG. 6 in an embodiment.
Figure 7B:
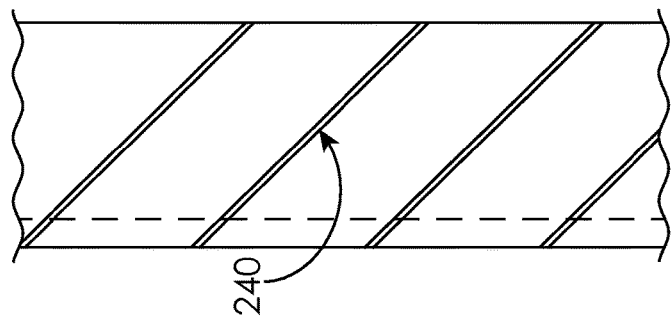
FIG. 7B is a schematic elevational view of a section of the seal of FIG. 6 in an embodiment.
Figure 7A:
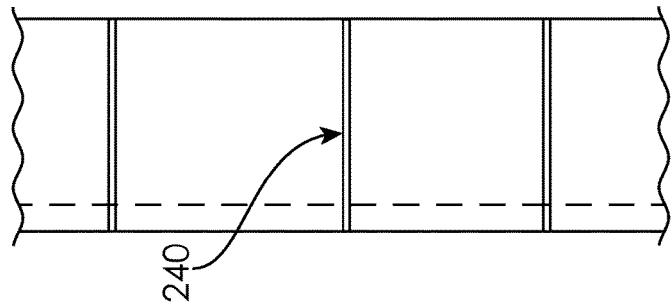
FIG. 7A is a schematic elevational view of a section of the seal of FIG. 6 in an embodiment.
Figure 8:
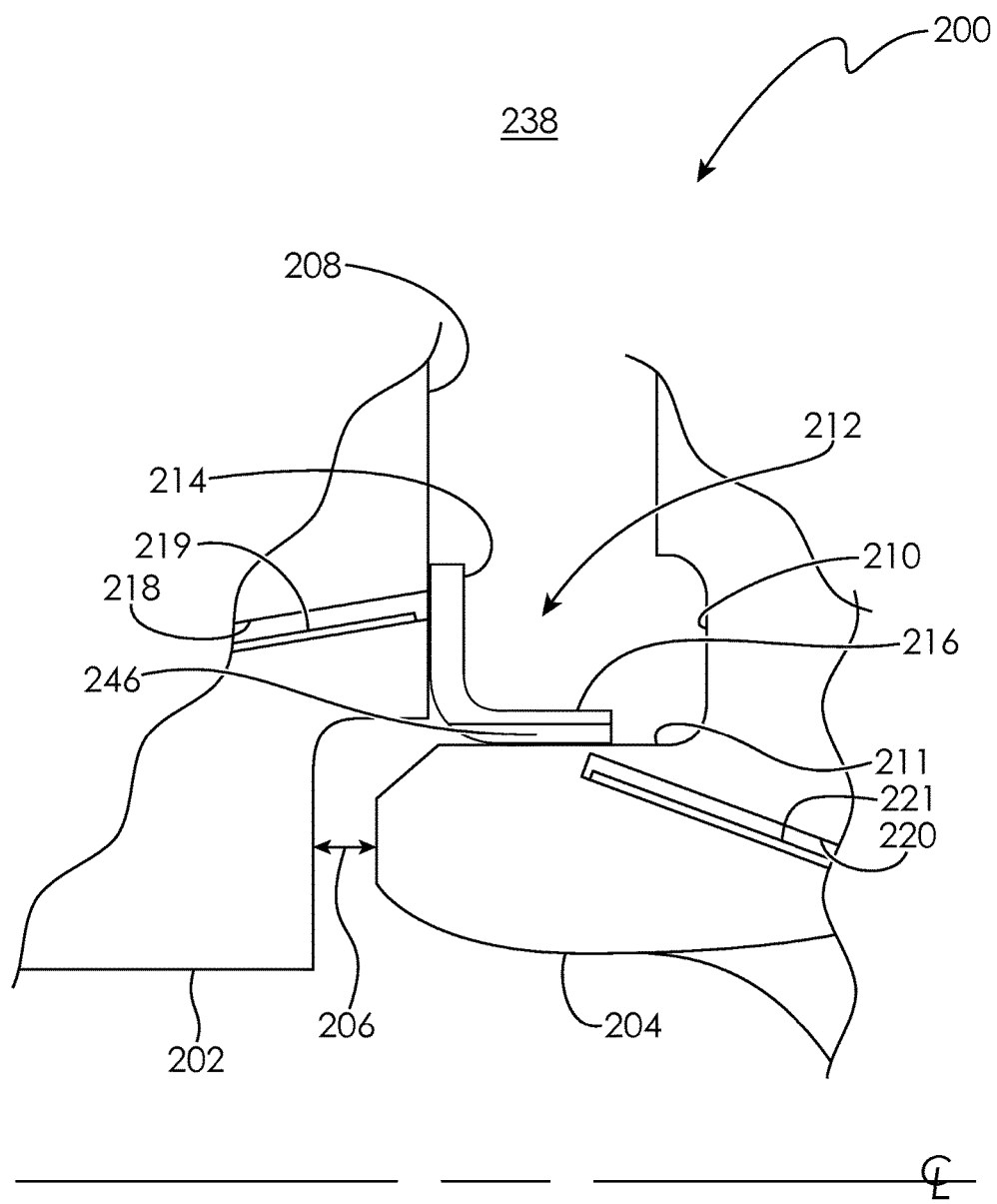
FIG. 8 is a schematic cross-sectional view of a seal and seal cavity in an embodiment.

The embodiment of FIG. 5 is substantially the same as the embodiment of FIG. 3, except the slots 242 are formed only partially into the thickness of the rail 214. The embodiment of FIG. 6 is substantially the same as the embodiment of FIG. 3, except the slots 244 are formed in the leg 216 instead of the rail 214. Axial slots 244, if aligned with intersegment gaps of the component 204, would enable the seal 212 to at least partially conform to reduce leakage associated with stair-stepped component 204 segments. The embodiment of FIG. 8 is substantially the same as the embodiment of FIG. 6, except the slots 246 are formed only partially into the thickness of the leg 216.

Slots 240-246 can be positioned in some embodiments to provide additional gas flow/cooling to specific locations of elevated temperature on each component 202 and/or 204 around the circumference (for example, to account for combustor pattern factors).

Figure 9:
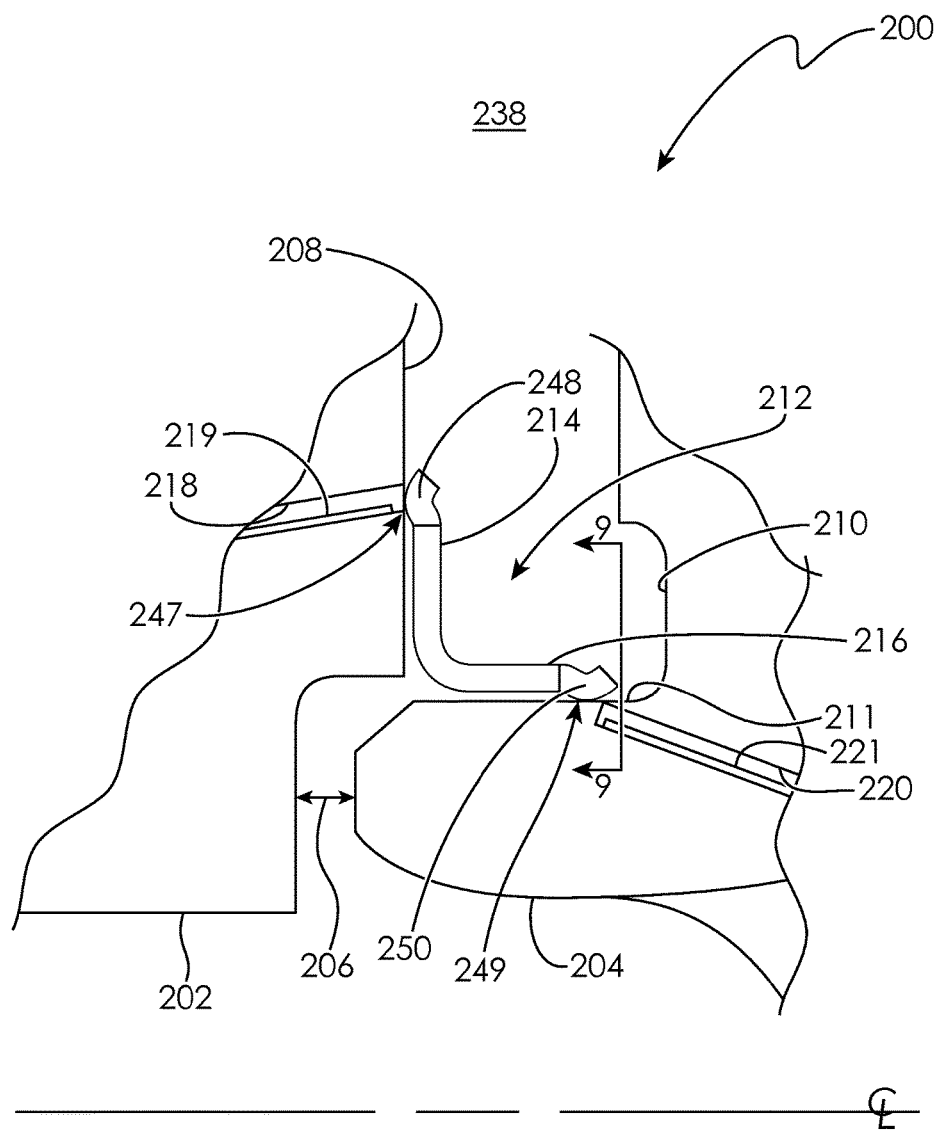
FIG. 9 is a schematic cross-sectional view of a seal and seal cavity in an embodiment.
Figure 10A:
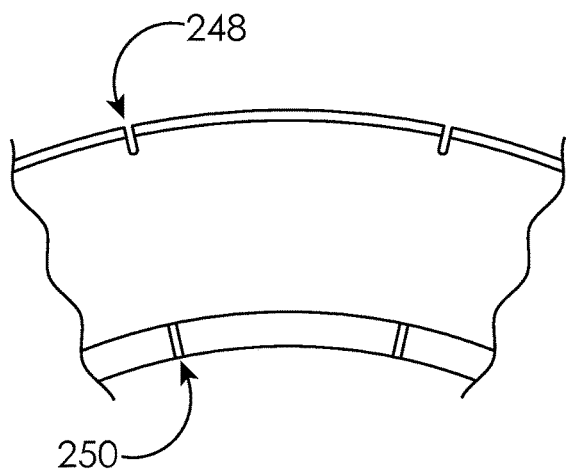
FIG. 10A is a schematic elevational view of a section of the seal of FIG. 9 in an embodiment.
Figure 10B:
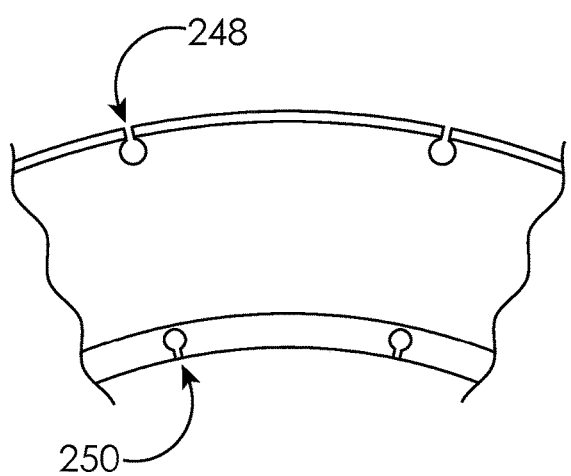
FIG. 10B is a schematic elevational view of a section of the seal of FIG. 9 in an embodiment.

In the embodiment of FIG. 9, the seal 212 contacts the component 202 at a circumferential axial protrusion 247 at the radially outer end of the rail 214, while the seal 212 contacts the component 204 at a circumferential radial protrusion 249 at the axially outer end of the leg 216. The protrusions 247, 249 serve to increase the axial and radial pressure load (acting to keep the seal 212 in sealing contact with the surfaces 208, 211) by increasing the piston area that the pressure differential across the seal 212 is acting upon. A slot 248 is formed into the protrusion 247, while a slot 250 is formed into the protrusion 249. As shown in FIG. 10A, the slots 248, 250 may be substantially linear in some embodiments. As shown in FIG. 10B, the slots 248, 250 may be substantially keyhole shaped or round in some embodiments. In some embodiments, only one of the slots 248, 250 is present.

Figure 11:
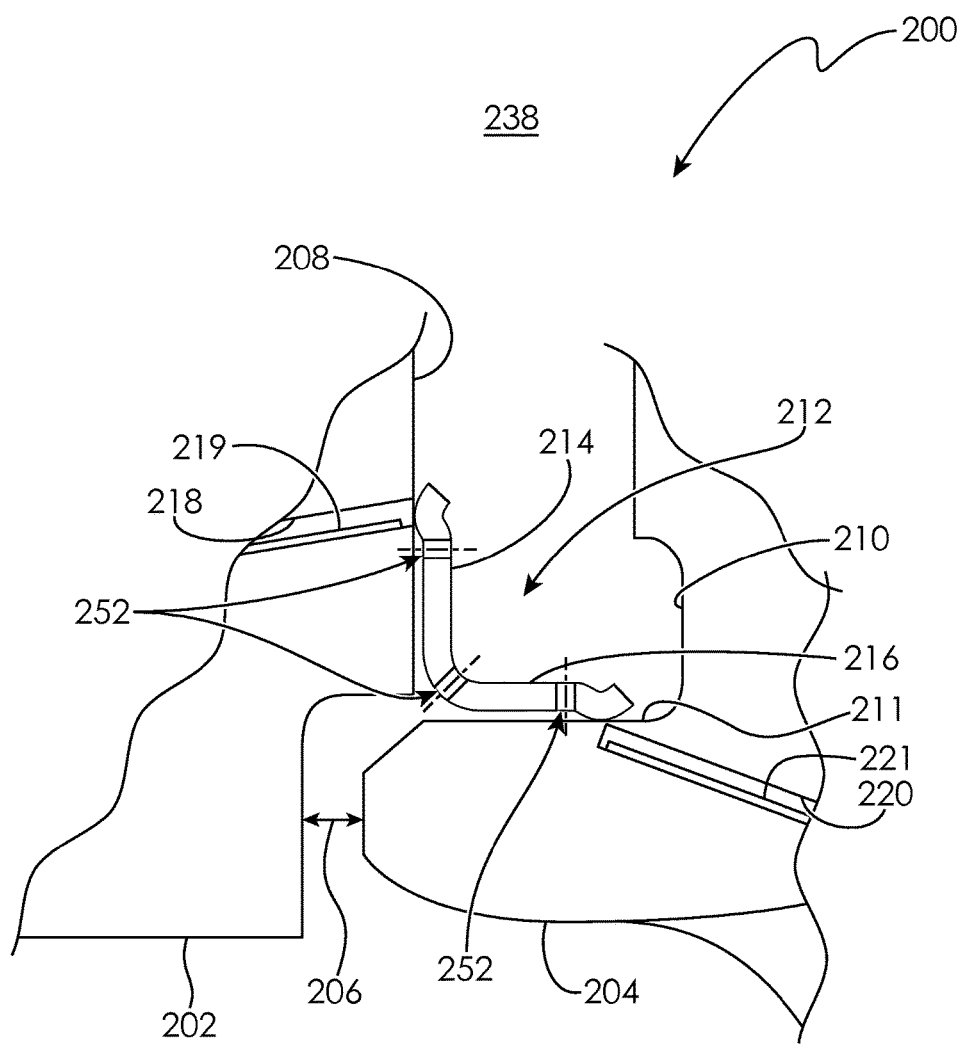
FIG. 11 is a schematic cross-sectional view of a seal and seal cavity in an embodiment.

In the embodiment of FIG. 11, one or more holes 252 are formed into one or more of the rail 214, the leg 216, or a junction between the rail 214 and the leg 216. The holes 252 may be used in lieu of or in addition to the slots 248, 250.

Figure 12:
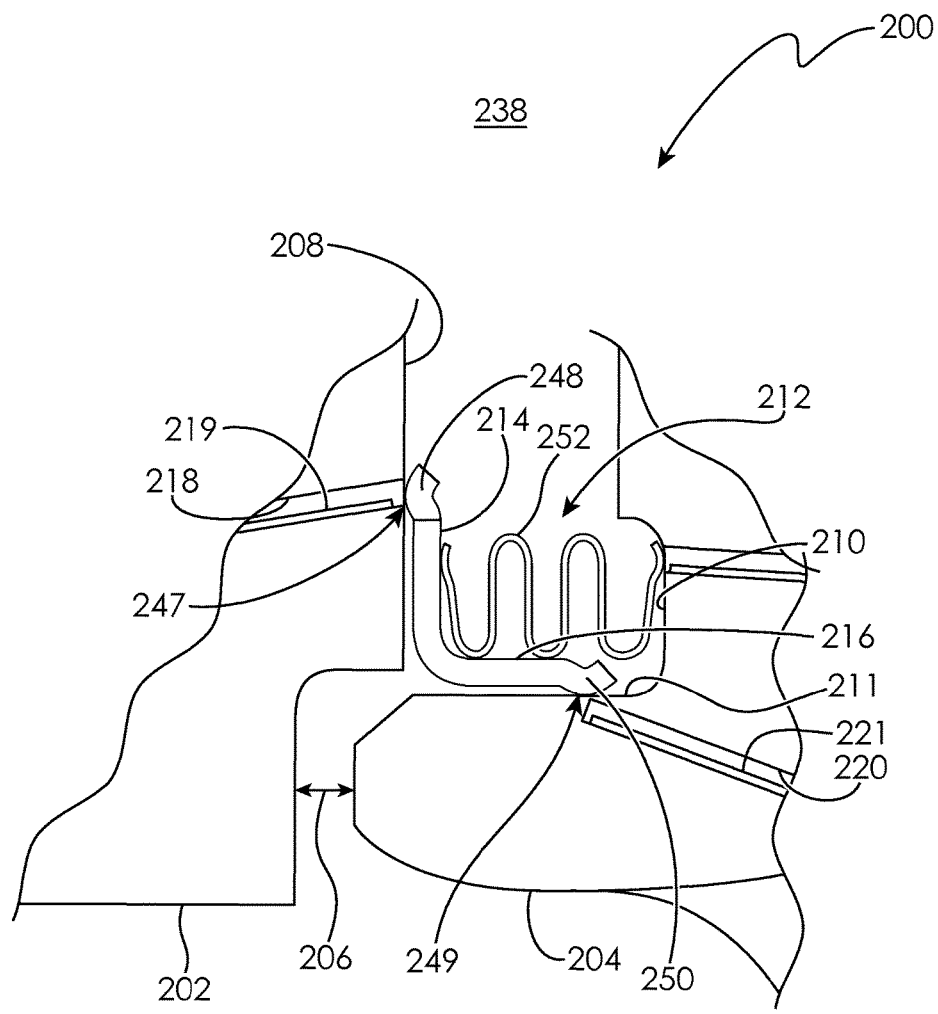
FIG. 12 is a schematic cross-sectional view of a seal and seal cavity in an embodiment.
Figure 13:
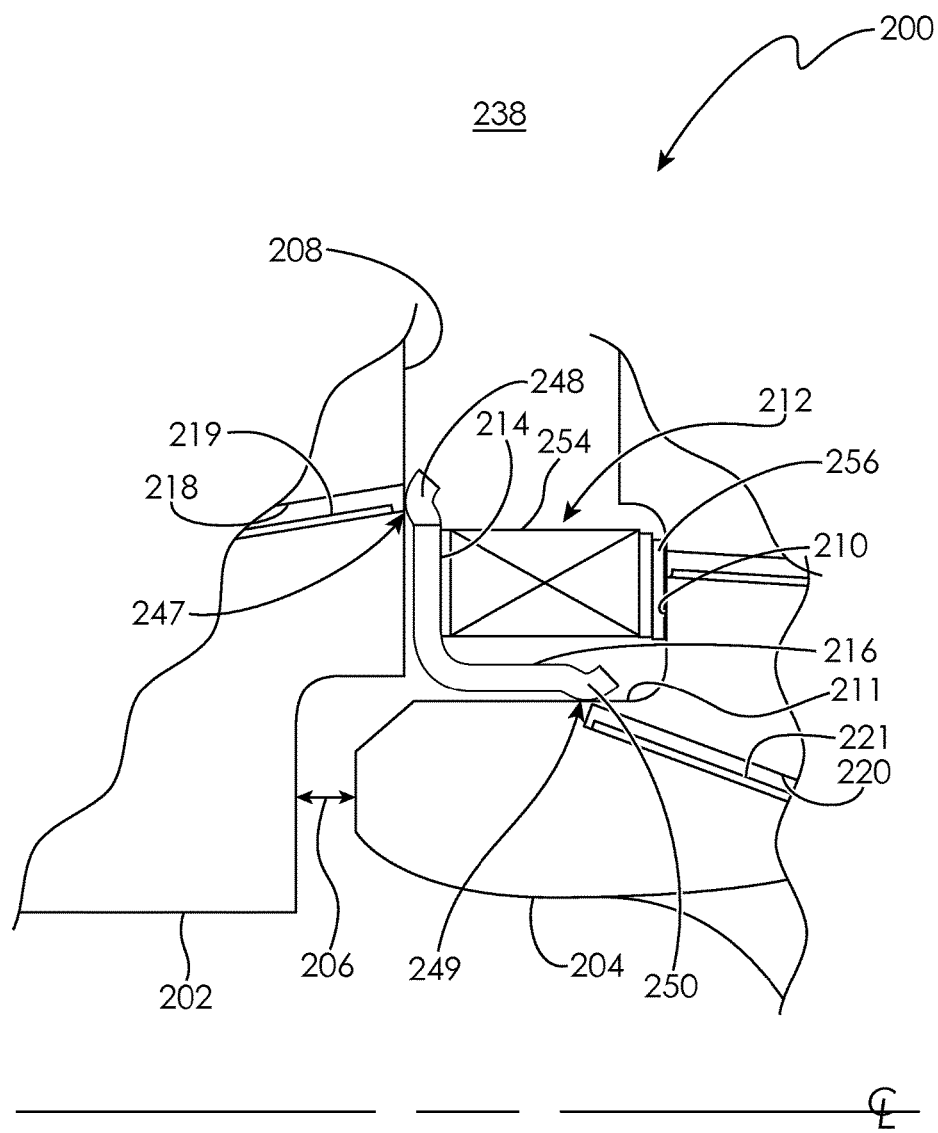
FIG. 13 is a schematic cross-sectional view of a seal and seal cavity in an embodiment.

FIGS. 12 and 13 illustrate embodiments that incorporate a second seal with any of the embodiments of the seal 212, the second seal having a secondary function of also providing an axial sealing load on the seal 212 that is additional to the pressure loading. This acts to seat the seal 212 against the surface 208 of the component 202 and to seat the secondary seal against the surface 210 of the component 204. In the embodiment of FIG. 12, the secondary seal comprises W-seal 252. In the embodiment of FIG. 13, the secondary seal comprises a wave-spring 254 attached (for example, by resistance welding, to name just one non-limiting example) to a flat ring 256. Adding a second seal 252, 254/256 improves sealing by contacting/sealing against a second/redundant location on the component 202. It also ensures that the seal 212 is loaded axially against the component 202. This prevents the seal 212 from being damaged during transportation and installation, and also ensures that the seal 212 is instantly and positively pressurized/pressure-energized at engine start-up.

Pressure in a secondary flow cavity 238 is transmitted to the seal cavity 200 through an opening defined by the components 202, 204. This pressure acts upon the surfaces of the seal 212, thereby causing the rail 214 to seat against the surface 208 of the component 202 and causing the leg 216 to seat against the surface 211 of the component 204. This prevents most of the secondary flow cavity 238 gases from reaching the design clearance 206 area and flow path, allowing only the desired amount of gas flow past the seal 212 and achieving desired cooling effects. As the two components 202 and 204 move relative to each other in the axial and/or radial direction, the seal 212 is free to slide relative to the components 202, 204 in the axial and radial directions and the circumferential direction, while the pressure forces acting upon the surfaces of the seal 212 load the seal 212 so that it remains in contact with both components 202 and 204 as shown. Therefore, sealing is maintained while the components 202 and 204 and the seal 212 move relative to one another. Because the seal 212 slides with respect to the components 202, 204, the seal 212 is not substantially deflected by the relative movement between the components 202 and 204.

The seal 212 is not flexed/stressed, as compared to a W-seal for example, so that a lower-strength, higher-temperature, more wear resistant material (for example, a cobalt alloy to name just one non-limiting example) may be used.

Compared to the W-seal 108, the seal 212 is more durable due to: a) increased resilience (since the seal 212 slides rather than being flexed/stressed), b) higher temperature capability, since the seal 212 can be made from a much lower-strength material having much higher temperature capability (for example, a cobalt-base alloy like HAYNES 188 or a non-hardenable nickel-base alloy like INCO 625, to name just a few non-limiting examples), c) improved wear resistance and/or wear tolerance because the seal 212 can be made from a more lubricious alloy (for example, a cobalt-base alloy, to name just one non-limiting example) and can be made significantly thicker.

In embodiments where a secondary W-seal 252 or a wave-spring/flat-washer 254/256 is incorporated with the seal 212, the combination is more durable than the W-seal 108 due to: a) the seal cavity 200 temperature is reduced (which may enable a higher-strength material to be used for the W-seal 252) because the seal cavity 200 is shielded from gas-path temperatures (radiation and hot-gas ingestion), as well as from conduction from the gas-path components 202, 204, and the metered/guided gas flow around the seal 212 reduces the seal cavity 200 temperature (by increasing the convective heat transfer coefficient h and preventing ingestion of gas path gases), b) wear is reduced since the seal 212 contacts the stair-stepped and very hot gas-path components 202, 204, and c) resilience is higher for the wave-spring/flat-washer 254/256. The seal 212 has improved vibration tolerance due to friction damping. The seal 212 exhibits potentially better sealing if the rail 214 is slotted through the entire thickness to allow it to at least partially conform to large stair-steps in the component 202.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a seal cavity defined by first and second adjacent components disposed about an axial centerline, the seal comprising:
    a seal comprising a split hoop including a substantially radially-extending rail and a substantially axially-extending leg; and
    a plurality of slots formed into at least one of the rail and the leg, wherein the plurality of slots extend in a parallel direction with respect to the at least one of the rail and the leg; and
    wherein the plurality of slots extend completely across a surface of either the at least one of the rail and the leg to control a flow of gas past the seal and wherein at least one of the plurality of slots has a slot thickness that is less than a thickness of the seal.

2. The seal of claim 1, wherein the seal comprises a first seal free-state inner diameter that is smaller than a seal cavity inner diameter, such that a radial preload is achieved between the seal and at least one of the first and second components.

3. The seal of claim 1, wherein at least one of the plurality of slots has an orientation of: axial, at an angle to the axial direction, or radial and at an angle to the radial direction.

4. The seal of claim 1, wherein at least one of the plurality of slots has a configuration of: constant width, or converging or diverging.

5. The seal of claim 1, further comprising a second seal disposed within the seal cavity between the first seal and one of the first and second components.

6. The seal of claim 5, wherein the second seal comprises one of:
    a W-seal; and
    a wave spring and a flat ring.

7. The seal of claim 1, wherein the seal is formed from one of a high-temperature metal alloy, a high-temperature ceramic material, and a high-temperature ceramic composite, or a combination of two or more of a high-temperature metal alloy, a high-temperature ceramic material, and a high-temperature ceramic composite.

8. The seal of claim 1, wherein at least one of the plurality of slots is formed completely through a thickness of the first seal.

9. The seal of claim 1, further comprising at least one of a circumferential axial protrusion disposed at a radially outer end of the rail and a circumferential radial protrusion disposed at an axially outer end of the leg.

10. The seal of claim 9, wherein at least one of the plurality of slots is formed though at least one of the circumferential axial protrusion and the circumferential radial protrusion.

11. The seal of claim 10, wherein the at least one of the plurality of slots comprises a shape selected from the group consisting of: linear and keyhole-shaped.

12. The seal of claim 1, further comprising at least one hole formed through at least one of the rail, the leg, and a junction between the rail and the leg.

13. The seal of claim 1, wherein the seal has a substantially J-shaped cross-section.

14. The seal of claim 1, wherein the seal has a substantially L-shaped cross-section.

15. The seal of claim 1, wherein the rail extends from the leg.

16. A seal for sealing a seal cavity defined by first and second adjacent components disposed about an axial centerline, the seal comprising:
- a split hoop seal comprising a rail and a leg, the rail extending radially from the leg and the leg extending axially from the rail;
- a plurality of slots formed into the rail, wherein the plurality of slots extend only partially into a thickness of the rail; and
- wherein the plurality of slots extend completely across a surface of the rail to control a flow of gas past the seal.

17. A seal for sealing a seal cavity defined by first and second adjacent components disposed about an axial centerline, the seal comprising:
- a split hoop seal comprising a rail and a leg, the rail extending radially from the leg and the leg extending axially from the rail;
- a plurality of slots formed into the leg, wherein the plurality of slots extend only partially into a thickness of the leg; and
- wherein the plurality of slots extend completely across a surface of the leg to control a flow of gas past the seal.

\* \* \* \* \*